United States Patent [19]

Draudt et al.

[11] Patent Number: 4,625,998
[45] Date of Patent: Dec. 2, 1986

[54] SWIVEL HOSE COUPLINGS

[76] Inventors: Donald A. Draudt, 31017 Lake Rd., Bay Village, Ohio 44140; Dale A. Draudt, 26240 Hickory La., Olmsted Falls, Ohio 44138

[21] Appl. No.: 596,234

[22] Filed: Apr. 2, 1984

[51] Int. Cl.⁴ .......................... A47L 9/24; F16L 17/00
[52] U.S. Cl. ........................................ 285/7; 285/110; 285/98; 285/331; 285/280; 285/423; 285/903
[58] Field of Search ...................... 285/7, 98, 278, 280, 285/281, 423, 331, DIG. 4, 110

[56] References Cited

U.S. PATENT DOCUMENTS

| | | | |
|---|---|---|---|
| 3,073,629 | 1/1963 | De Marco | 285/423 |
| 3,167,330 | 1/1965 | Draudt | 285/DIG. 4 |
| 3,380,765 | 4/1965 | Himmel | 285/331 |
| 3,565,464 | 2/1971 | Wolf | 285/98 |
| 3,727,949 | 4/1973 | Kleykamp et al. | 285/7 |
| 4,211,438 | 7/1980 | Asberg | 285/281 |
| 4,400,022 | 8/1983 | Wright | 285/DIG. 4 |
| 4,423,891 | 1/1984 | Menges | 285/DIG. 4 |
| 4,427,219 | 1/1984 | Madej | 285/331 |
| 4,437,691 | 3/1984 | Laney | 285/DIG. 4 |
| 4,477,109 | 10/1984 | Kleuver | 285/331 |

FOREIGN PATENT DOCUMENTS

| | | | |
|---|---|---|---|
| 2633678 | 2/1978 | Fed. Rep. of Germany | 285/DIG. 4 |
| 3001665 | 7/1981 | Fed. Rep. of Germany | 285/DIG. 4 |
| WO81/00748 | 3/1981 | PCT Int'l Appl. | 285/DIG. 4 |

Primary Examiner—Cornelius J. Husar
Assistant Examiner—Anthony Knight
Attorney, Agent, or Firm—Renner, Otto, Boisselle & Lyon

[57] ABSTRACT

In one form of the invention, the swivel hose couplings include two parts, a swivel insert which may be threaded or otherwise attached to the end of the hose, and a swivel hose end piece which has an internal groove therein in which an exterior portion of the swivel is rotatably received. A sealing lip may be provided on the exterior of the swivel insert to form a seal with the wall of the internal groove in the swivel hose end piece. Also, a skirt portion may be provided on the swivel hose end piece which extends axially into the end of the hose to shield the axial outer end of the swivel insert and hose end against entrained material in the fluid passing through the coupling from entering the swivel connection between the swivel insert and swivel hose end piece. In another form of the invention, the swivel hose end piece may consist of two separate parts, a plain end portion and a swivel insert retaining end portion, thereby permitting the plain end portion to be made of a softer, more pliable plastic material than the swivel insert retaining end portion. To connect the plain end portion to the swivel insert retaining end portion, an external annular groove is provided adjacent the axial inner end of the plain end portion for receipt of an inturned end at the axial outer end of the swivel insert retaining end portion. An inturned flange may also be provided on the swivel insert retaining end portion adjacent the axial inner end of the plain end portion to provide a hard bearing surface for the axial outer end of the swivel insert. In another form of swivel hose coupling in accordance with the invention, a two-piece swivel hose end is provided, including a threaded end portion for threaded engagement with the end of a corrugated plastic hose, and a plain end portion which is coupled to the threaded end portion by engagement of an inturned flange on the axial outer end of the threaded end portion in an external annular groove in the plain end portion adjacent the axial inner end thereof.

21 Claims, 12 Drawing Figures

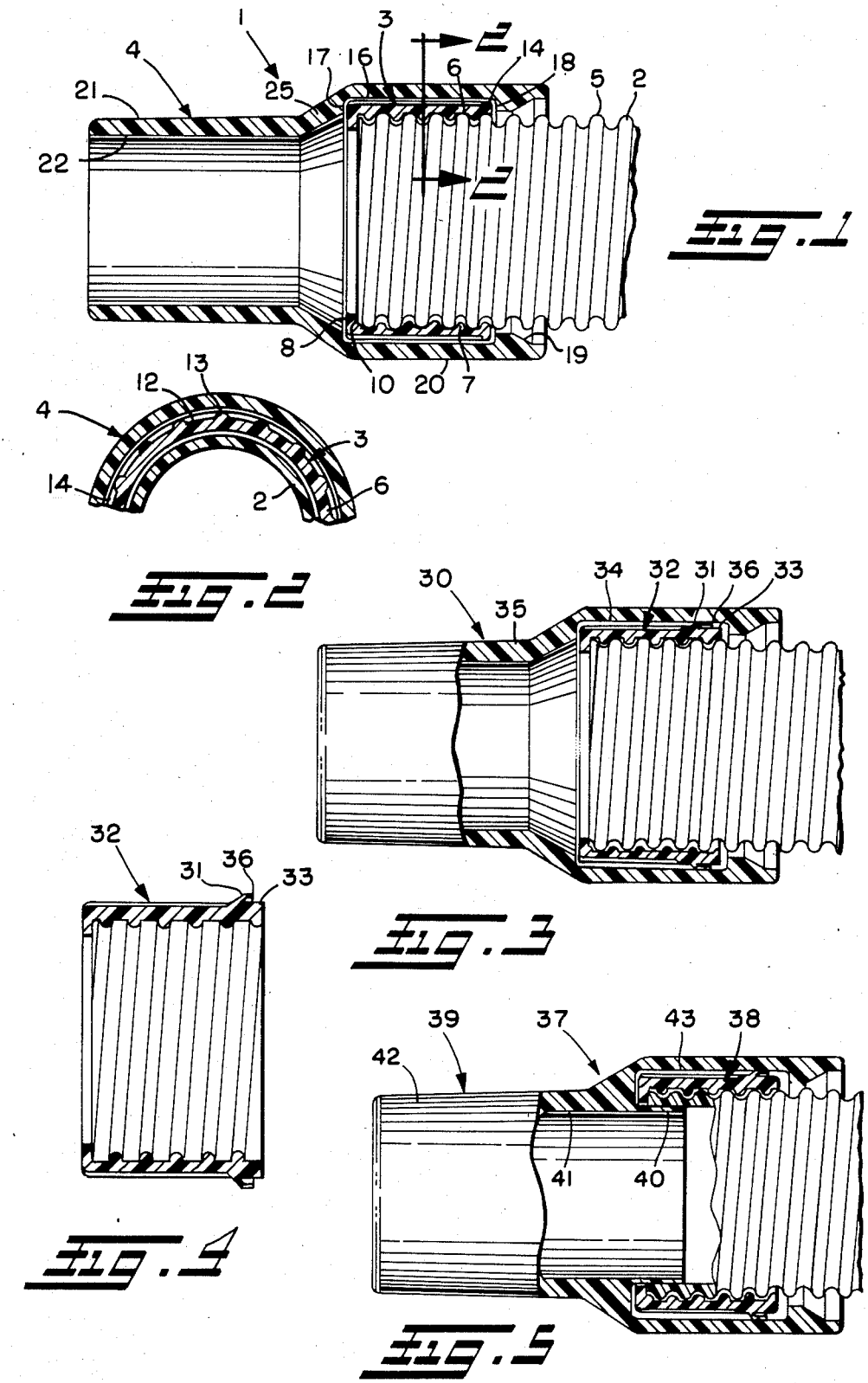

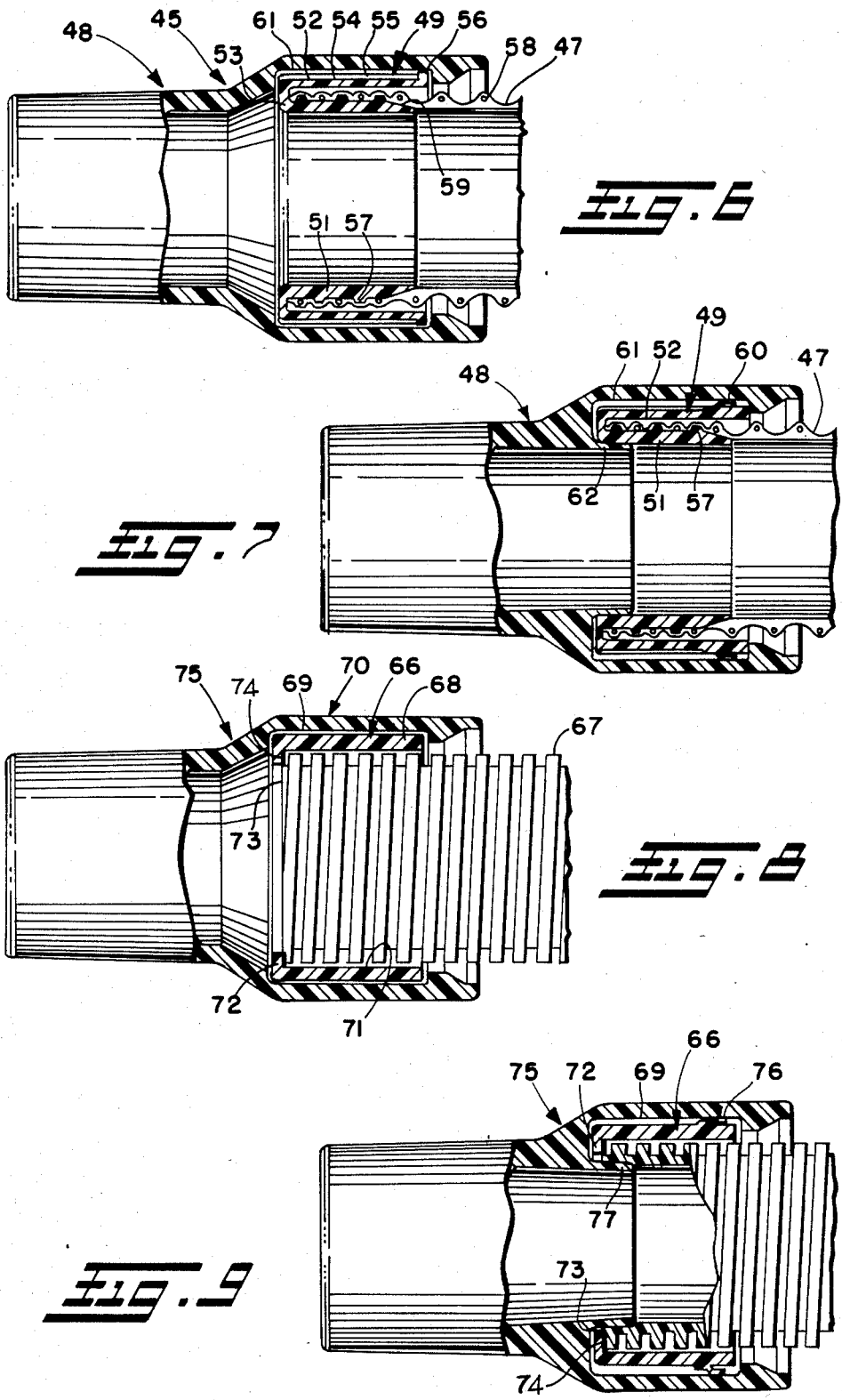

SWIVEL HOSE COUPLINGS

BACKGROUND OF THE INVENTION

This invention relates generally as indicated to swivel hose couplings, and more particularly to certain improvements in such couplings for providing a swivel hose end on the end of a hose that is free to swivel thereon while providing a seal against air or fluid loss through the coupling.

SUMMARY OF THE INVENTION

A principal object of this invention is to provide a swivelable self-sealing coupling on the end of a flexible tubular member such as a hose that does not require critical dimensional stability and is relatively inexpensive to manufacture and install.

Another object is to provide such a swivel hose coupling that can readily be removed and replaced in the field.

Still another object is to provide different coupling configurations for use on different types of hose.

These and other objects of the present invention may be achieved by providing in one form of the invention a swivel hose coupling including two parts, a swivel insert which may be threaded or otherwise attached to the end of the hose, and a swivel hose end piece which is rotatably connected to the hose end by the swivel insert. The swivel hose end piece has an internal groove therein in which an exterior portion of the swivel insert is rotatably received.

Circumferentially spaced longitudinally extending grooves and lands may be provided on the exterior of the swivel insert to provide a good bearing contact for the swivel hose end piece with minimum friction therebetween. The grooves desirably terminate short of the axial inner end of the swivel insert to provide an external flange or shoulder thereat which overlaps the adjacent end of the internal groove in the swivel hose end piece to form a fluid-tight seal. At the axial inner end of the insert is an inturned flange which also overlaps the adjacent end of the internal groove in the swivel hose end piece to form a fluid-tight seal.

A sealing lip may be provided on the exterior of the swivel insert to form an additional seal with the wall of the internal groove in the swivel hose end piece. Also, a skirt portion may be provided on the swivel hose end piece which extends axially inwardly for a portion of the length of the internal groove and radially inwardly spaced therefrom so that the skirt portion extends a short distance into the end of the hose to shield the axial outer end of the swivel insert and hose end against entrained material and other debris in the fluid passing through the coupling from entering the swivel connection between the swivel insert and swivel hose end piece.

For attachment of the swivel hose coupling to wire reinforced hose, the swivel insert desirably includes a pair of concentric, radially spaced inner and outer tubular sleeve portions connected together at the axial outer ends thereof by a radially extending end wall portion. The exterior surface of the inner sleeve portion is threaded for threaded engagement with the hose wire reinforcement interiorly of the hose.

Alternatively, a hot melt grommet may be used in place of the threaded swivel insert to provide a hot melt connection between the grommet and either a smooth or corrugated plastic hose.

In still another form of swivel hose coupling in accordance with the present invention, the swivel hose end piece may consist of two separate parts, a plain end portion and a swivel inset retaining end portion, thereby permitting the plain end portion to be made of a softer, more pliable plastic material than the swivel insert retaining end portion to facilitate insertion of an attachment piece over the tapered end of the plain end portion for enhanced gripping therebetween. To connect the plain end portion to the swivel insert retaining end portion, an external annular groove may be provided adjacent the axial inner end of the plain end portion for receipt of an inturned end at the axial outer end of the swivel insert retaining end portion. Also, an inturned flange may be provided on the swivel insert retaining end portion adjacent the axial inner end of the plain end portion to provide a hard bearing surface for the axial outer end of the swivel insert.

In yet another form of swivel hose coupling in accordance with this invention, a two-piece swivel hose end is provided, including a plain end portion and a threaded end portion having internal threads thereon for threaded engagement with the end of a corrugated plastic hose. A swivel coupling is provided between the plain end portion and threaded end portion as by providing an inturned flange on the axial outer end of the threaded end portion for receipt in an external annular groove adjacent the axial inner end of the plain end portion. In this case, both the plain end portion and threaded end portion are desirably made of a relatively hard plastic material to provide a better bearing surface therebetween and prevent the plain end portion from being accidentally pulled off the threaded end portion.

Such swivel hose couplings may be used to attach a nozzle or other attachment device to the end of a vacuum hose and permit the attachment to be rotated or twisted and angled without having to unduly rotate or twist the hose. The swivel hose couplings make it easier for the user to move the hose about to different places and angles, by swiveling the swivel hose couplings rather than having to twist the hose. Not only is it sometimes difficult to twist the hose, but undue twisting could lead to premature failure of the hose and possibly obstruct the passage of fluid through the hose.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 1 is a longitudinal section through one form of swivel hose coupling in accordance with this invention shown connected to the end of a corrugated plastic tube;

FIG. 2 is an enlarged fragmentary transverse section through the swivel hose coupling of FIG. 1, taken on the plane of the line 2—2 thereof;

FIG. 3 is a longitudinal section through another form of swivel hose coupling in accordance with this invention;

FIG. 4 is an enlarged longitudinal section through the swivel insert for the swivel hose coupling of FIG. 3; and FIGS. 5–12 are longitudinal sections through still other forms of swivel hose couplings in accordance with this invention.

DESCRIPTION OF THE PREFERRED EMBODIMENTS

Figure 10:
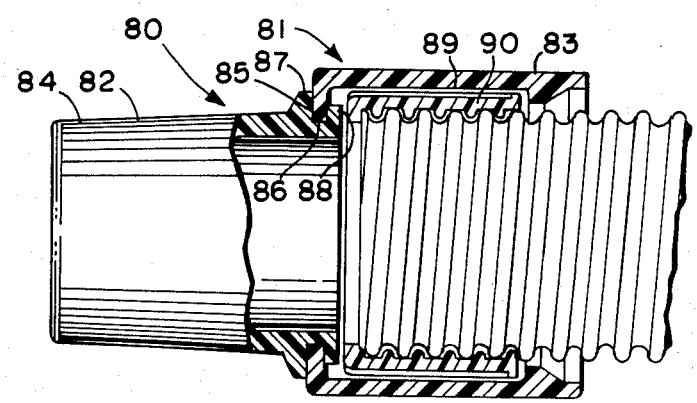

Referring now in detail to the drawings, and initially to FIG. 1 thereof, one form of swivel hose coupling 1 in accordance with this invention is shown attached to the end of a flexible tubular member or hose 2. The swivel hose coupling 1 essentially consists of two parts, a swivel insert 3 which is attached to the hose itself, and a swivel hose end piece 4 which is rotatably connected to the hose end by the swivel insert. When the hose 2 is blow molded out of a suitable plastic and provided with an external spiral groove or thread 5 therein to give it flexibility as shown in FIG. 1, the swivel insert 3 is desirably molded in the form of a sleeve 6 with an internal thread or corrugation 7 which is complementary to the spiral groove on the hose so that the swivel insert may be screwed or threaded onto the end of the hose. At the axial outer end of the swivel insert is an inturned flange or shoulder 8 which may be engaged by the tip 10 of the hose when the swivel insert is fully threaded onto the hose to form a fluid-tight seal thereat.

Referring further to FIG. 1, and also to FIG. 2, preferably the exterior of the swivel insert sleeve 6 has a plurality of circumferentially spaced longitudinally extending external grooves 12 therein separated by relatively narrow ribs or lands 13 therebetween. The grooves 12 desirably terminate short of the axial inner end of the sleeve to provide an external flange or shoulder 14 thereat, for a purpose to be subsequently described.

The swivel hose end piece 4 is of a length substantially greater than the length of the swivel insert 3 and has an internal groove 16 therein of a diameter and length somewhat greater than the outer diameter and length of the swivel insert for receipt of the exterior portion of the swivel insert therein. At the ends of the internal groove are internal shoulders or flanges 17, 18 which have an inner diameter somewhat less than the outer diameter of the swivel insert thereby preventing disassembly of the swivel hose end piece from the swivel insert while permitting swiveling or rotation of the swivel hose end piece relative to the hose.

The internal shoulder 18 at the axial inner end of the internal groove 16 has an inner diameter somewhat greater than the outer diameter of the hose 2 so as not to bind on the hose thereat. Also, the internal surface of the swivel hose end piece desirably tapers radially outwardly from the internal shoulder 18 toward the axial inner end of the swivel hose end piece to provide a taper or cam surface 19 adjacent such axial inner end to facilitate assembly of the swivel hose end piece onto the swivel insert and also provide additional radial clearance around the hose to accommodate some bending of the hose in any transverse direction. At the same time, the taper 19 only permits a gradual bending of the hose to prevent any abrupt and deleterious bending of the hose adjacent the axial inner end of the swivel insert. Any forces acting on the hose tending to bend the hose too abruptly will result in the hose being supported by the outwardly flaired taper 19.

The inner end portion 20 of the swivel hose end piece 4 which surrounds the end of the hose when the swivel hose end piece is assembled on the swivel insert 3 desirably has a generally cylindrical exterior for ease of gripping by the user. The outer end portion 21 of the swivel hose end piece forwardly of the swivel insert desirably has a reduced outer diameter and gradually tapers inwardly toward the axial outer end thereof to provide for wedging contact with a nozzle or other attachment device inserted over such outer end. Centrally of the outer end portion 21 is a longitudinal opening 22 through which fluid passes into the hose when a suction force is applied thereto.

The swivel insert 3 is desirably made of a relatively hard plastic material having a relatively low coefficient of friction with the swivel hose end piece 4 so that the swivel hose end piece is freely rotatable relative to the swivel insert, and the swivel insert cannot be pulled off the hose end. Likewise, the swivel hose end piece 4 is desirably made of a relatively hard and longitudinally rigid plastic material to prevent the swivel hose end piece from being pulled off the swivel insert and provide a relatively rigid handle for the user and a relatively rigid mounting for the attachments on the axial outer end thereof so that the user may easily guide and direct the attachments during the cleaning or vacuuming operation.

The external lands or ribs 13 on the outer surface of the swivel insert provide a good bearing contact for the swivel hose end piece while minimizing the friction therebetween. Moreover, such external ribs may be advantageously used to aid in screwing the swivel insert onto the hose end.

Fluid leakage between the hose and swivel insert 3 is prevented by engagement of the tip of the hose with the inturned lip 8 at the axial outer end of the swivel insert. Likewise, fluid leakage between the swivel insert and swivel hose end piece is substantially prevented when one or the other end of the swivel insert is forced into engagement with the adjacent end of the internal groove 16 in the swivel hose end piece. The inturned flange or lip 8 on the axial outer end of the swivel insert overlaps the adjacent shoulder 17 of the internal groove to form a fluid-tight joint thereat when forced into engagement with each other. Similarly, the external shoulder 14 at the axial inner end of the swivel insert overlaps the adjacent shoulder 18 of the internal groove to form a fluid-tight joint when forced into engagement.

Prior to assembly of the swivel hose end piece 4 onto the swivel insert 3, the swivel hose end piece should be heated up somewhat, for example, to approximately 100° to 110° F., to make it more pliable so that it will stretch. When thus heated, the axial inner end of the swivel hose end piece can readily be pushed onto the swivel insert after the swivel insert has been screwed or otherwise attached to the hose end. The outwardly tapered opening 19 at the axial inner end of the swivel hose end piece assists in camming such axial inner end over the axial outer end of the swivel insert as the swivel hose end piece is pushed onto and along the swivel insert until the swivel insert seats within the internal groove 16 in the swivel hose end piece.

Although the dimensions of the swivel hose coupling will vary depending on the size of the hose with which the coupling is used, such coupling does not require critical dimensional stability. As an example, a swivel hose coupling for use with a blow molded hose having an inner diameter (I.D.) of approximately 1½" and a corrugated outer diameter (O.D.) of approximately 1 13/16" may be dimensioned substantially as follows:

The swivel insert 3 may have a length of approximately 1 5/16", an I.D. of approximately 1 13/16", and an O.D. of approximately 2 1/16". Also, there may be for example 12 to 16 external grooves and lands on the outer surface of the swivel insert. Where 16 grooves and lands are provided, the grooves may have a width of approximately ¼" and the lands width of approximately ⅛". The grooves may have a depth of approximately 3/64", and both the inturned lip 8 at the axial outer end of the swivel insert and outturned shoulder 14 at the axial inner end thereof may have an overall radial height of approximately 3/16".

The handle portion 20 of the swivel hose end piece 4 may have an O.D. of approximately 1 5/16" and an axial length of approximately 1¾". Also, the internal groove 16 may have an inner diameter of approximately 2⅛" and an axial length of approximately 1 11/32", and the inner diameter of the shoulders 17, 18 adjacent opposite ends of the internal groove may be approximately 1⅞". From the inner diameter of the shoulder 18 adjacent the axial inner end of the swivel hose end piece, the inner wall of the swivel hose end piece may extend axially inwardly approximately ⅛" and then taper radially outwardly at an angle of approximately 30° to form the tapered opening 19 which may have an axial length of approximately 7/32". From the outer diameter of the tapered opening 19, the inner wall desirably extends axially inwardly for the remainder of the length thereof, which may be approximately 3/32".

The opposite end portions 20, 21 of the spiral hose end piece 4 may be interconnected by a sharply tapered intermediate portion 25 which may have a slope of approximately 34° from the horizontal. The inner diameter of the opening 22 through the forward end portion 21 is approximately 1 7/16", whereas the outer wall of such forward end portion 21 desirably gradually tapers inwardly from a maximum outer diameter of approximately 1⅞" adjacent the axial outer end of the intermediate portion 25 to a minimum outer diameter of approximately 1 11/16" adjacent the axial outer end of the forward end portion, which may have an overall length of approximately 2".

In FIG. 3 there is shown another form of swivel hose coupling 30 in accordance with this invention which is substantially identical to the swivel hose coupling 1 shown in FIGS. 1 and 2, except for the addition of an annular sealing lip 31 on the exterior of the swivel insert 32. The sealing lip 31 is adjacent the axial inner end of a radially outwardly extending flange 33 on the axial inner end of the swivel insert, and when the fully extended position shown in FIG. 4 prior to insertion of the swivel hose end piece onto the swivel insert, extends radially outwardly therebeyond a sufficient distance, for example 5/64", to provide for sealed engagement with the inner diameter of the internal groove 34 in the swivel hose end piece 35 when the assembly is complete. Also, the sealing lip 31 desirably tapers outwardly at an angle of approximately 40° from the horizontal towards the axial inner end thereof and then has a cylindrical portion 36 that extends generally axially for a short distance, for example, approximately 1/16". When the swivel hose end piece is assembled onto the swivel insert as shown in FIG. 3, the sealing lip 31 is flattened out somewhat by engagement with the wall of the internal groove 34 to form a fluid-tight seal therebetween. Otherwise, the swivel hose coupling shown in FIG. 3 may be substantially the same as that shown in FIGS. 1 and 2.

FIG. 5 shows still another swivel hose coupling 37 in accordance with this invention in which the swivel insert 38 may be identical to either of the swivel inserts 3 and 32 previously described. The swivel hose end piece 39 may also be substantially the same as the swivel hose end pieces 4 and 35 previously described. However, such swivel hose end piece 39 additionally includes an annular skirt portion 40 extending axially inwardly from the inner end of the longitudinal bore 41 in the outer end portion 42. The skirt portion 40 extends axially inwardly for a portion of the length of the internal groove 43 and radially inwardly spaced therefrom to shield the axial outer end of the swivel insert 38 and hose end against entrained material and other debris in the fluid passing therethrough from entering the swivel connection between the swivel insert and swivel hose end piece surrounding same. Also, the skirt portion 40 assists in helping to establish a fluid seal at the axial outer end of the hose.

Although the dimensions of the skirt portion 40 may vary depending on the type and size of hose and the particular application, a swivel hose coupling for a 1½" diameter hose may have a skirt length of from approximately ¼" to ⅜", with sufficient clearance, for example, approximately 13/32", between the internal groove 43 and outer diameter of the skirt portion to receive the swivel insert and hose end therebetween.

Still another form of swivel hose coupling 45 is shown in FIG. 6 for attachment to a wire reinforced hose 47. Such coupling is very similar to that shown in FIG. 1, including particularly the swivel hose end piece 48 which may be identical to the swivel hose end piece 4. Also, the swivel insert 49 may be similar to the swivel insert 3 shown in FIG. 1, except that it includes a pair of concentric, radially spaced inner and outer tubular sleeve portions 51, 52 connected together at the axial outer ends thereof by a radially extending end wall portion 53. The exterior surface of the outer sleeve portion 52 may be provided with a plurality of circumferentially spaced axially extending grooves 54 and lands 55, with an outturned lip 56 at the axial inner end of the outer sleeve portion, similar to the swivel inserts previously described. However, the threads or corrugations 57, rather than being provided on the internal surface of the outer sleeve portion, are provided on the exterior surface of the inner sleeve portion 51. Such inner sleeve portion has an outer diameter slightly greater than the inner diameter of the wire reinforced hose 47 for engagement between the hose wire reinforcements 58 interiorly of the hose. The inner sleeve portion 51 adjacent the axial inner end thereof tapers radially inwardly toward such axial inner end to provide an inwardly flaired end surface 59 thereon to aid in inserting the inner sleeve portion into the hose.

Such internal threaded engagement of the swivel insert 49 within the wire reinforced hose 47 has the advantage that as the hose and swivel insert are screwed together, the hose is slightly compressed, which causes the hose wire reinforcements to expand somewhat to make the assembly easier. During use, as the hose is stretched or tensioned, the hose wire reinforcements 58 contract somewhat thereby enhancing the gripping action between the hose and swivel insert.

The modified swivel insert 49 with male threads 57 may also be provided with a sealing lip 60 adjacent the axial outer end of the outer sleeve portion 52 for sealing engagement with the wall of the internal groove 61 in the swivel hose end piece 48 as shown in FIG. 7, similar to the sealing lip 31 of the FIGS. 3 and 4 embodiment. Also, a skirt portion 62 may be provided on the swivel hose end piece 48 extending axially inwardly beyond the axial outer end of the internal groove 61 and radially spaced therefrom to provide a dirt or containment seal keeping dirt out of the swivel area of such swivel hose coupling, similar to the skirt portion 40 shown in FIG. 5.

In another form of swivel hose coupling 70 in accordance with this invention shown in FIG. 8, a hot melt grommet 66 is used in place of the swivel inserts previously described to provide a hot melt connection between the grommet and either a smooth or corrugated plastic pipe 67. As shown, the grommet 66 includes a tubular sleeve portion 68 having an outer diameter and axial length somewhat less than the inner diameter and axial length of the internal groove 69 in the swivel hose end piece 75. The inner wall 71 of the grommet may be relatively smooth, and has an inner diameter somewhat greater than the outer diameter of the hose to permit the grommet to be easily inserted over the end of the hose. At the axial outer end of the grommet is a radial inturned flange 72 which is engaged by the tip 73 of the hose. The grommet is securely fastened to the hose by applying a hot melt plastic material 74 to the axial inner end of the inturned flange 72 or tip 73 of the hose just prior to inserting the grommet over the end of the hose. Then, when the inturned flange is pushed up against the tip of the hose, the hot melt plastic material melts the abutting end surfaces of the hose and grommet and bonds the two surfaces together as the hot melt material cools, thereby forming a secure connection therebetween.

Thereafter, the swivel hose end piece 75, which may be identical to the swivel hose end piece 4 previously described, may be heated somewhat and then shoved over the grommet 66 on the hose end to receive the grommet grommet within the internal groove 69 in the swivel hose end piece to form a swivel coupling therebetween. With such a coupling, the fluid passing therethrough will force one or the other end of the grommet into sealing engagement with the adjacent ends of the internal groove in the swivel hose end piece. However, if desired, an annular sealing lip 76 similar to the sealing lip 31 shown in FIG. 3 may also be provided on the outer diameter of the grommet 66 to form a further seal with the internal wall of the annular groove 69 in the swivel hose end piece 75 as shown in FIG. 9. Also, an axially extending skirt 77 similar to the skirt 40 of FIG. 5 may be provided on the swivel hose end piece extending axially into the hose end for a short distance to keep dirt and other material entrained in the fluid from entering the swivel connection between the swivel insert and swivel hose end piece as further shown in FIG. 9.

FIG. 10 shows yet another form of swivel hose coupling 80 in accordance with this invention which may be substantially the same as the couplings previously described. However, in this case the swivel hose end piece 81 consists of two separate pieces, a plain end 82 and a swivel insert retaining end 83, thereby permitting the plain end 82 to be made of a softer, more pliable plastic material than the swivel insert retaining end 83 to facilitate insertion of an attachment piece over the tapered axial outer end portion 84 for enhanced gripping therebetween. To connect the plain end 82 to the swivel insert retaining end 83 of the swivel hose end piece 81, the plain end 82 may be provided with an external annular groove 85 adjacent the axial inner end thereof for receipt of an inturned end 86 at the axial outer end of the swivel insert retaining end. Radially outwardly extending flanges 87, 88 may be provided on the plain end 82 adjacent opposite sides of the external groove 85 to provide a deeper groove in the plain end 82 for the inturned end 86 on the axial outer end of the swivel inside retaining end 83 for increased stability.

In the swivel hose coupling configuration shown in FIG. 10, the internal groove 89 in the swivel insert retaining end 83 is of a length somewhat greater than both the outturned flange 88 at the axial inner end of the plain end 82 and the swivel insert 90 for receipt of both the flange 88 and insert 90 therein. In that event, the outturned flange 88 ends up being the bearing surface for the axial outer end of the swivel insert, which may not be as effective as desired because of the softer material from which the plain end 82 is desirably made.

Figure 11:
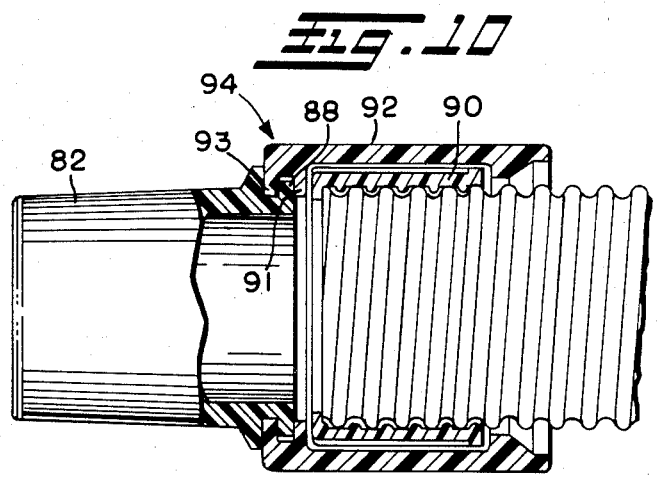

An improved bearing surface may be provided for the axial outer end of the swivel insert 90 by providing an inturned flange 91 on the swivel insert retaining end 92 axially inwardly of the inturned end 93 as shown in FIG. 11. The axial spacing between the inturned flange 91 and inturned end 93 of the swivel insert retaining end 92 is slightly greater than the axial thickness of the outturned flange 88 on the plain end 82 to accommodate the outturned flange 88 therebetween. Otherwise, the swivel coupling 94 shown in FIG. 11 may be substantially identical to that shown in FIG. 10, including an identical plain end 82 and swivel insert 90.

Figure 12:
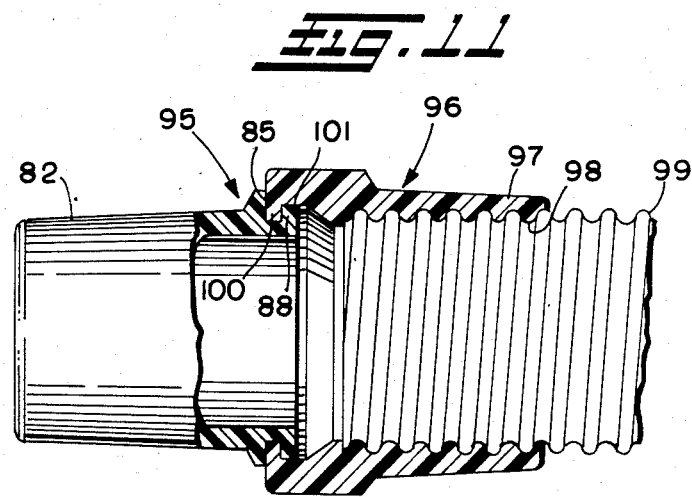

Another form of swivel hose coupling 95 in accordance with this invention is shown in FIG. 12, in which a two-piece swivel hose end 96 is provided, including a plain end portion 82 which may be identical to the plain end portion shown in FIGS. 10 and 11, and a threaded end portion 97 having internal threads or corrugations 98 thereon for threaded engagement on the end of a corrugated plastic hose 99. A swivel coupling is formed between the plain end 82 and threaded end 97 as by providing an inturned end 100 on the axial outer end of the threaded end for receipt in the external annular groove 85 adjacent the axial inner end of the plain end. The threaded end 97 may have an axially extending internal surface portion 101 adjacent the axial inner end of the inturned end 100 which is of a diameter substantially equal to the outer diameter of the outturned flange 88 of the plain end 82 to provide additional support between the plain end and threaded end. Also, both the plain end and threaded end shown in FIG. 12 are desirably made of a relatively hard plastic material to provide a better bearing surface therebetween which facilitates swiveling of the plain end relative to the threaded end, and to prevent the plain end from being inadvertently pulled off the threaded end and the threaded end from being pulled off the hose end.

Although the invention has been shown and described with respect to certain preferred embodiments, it is obvious that equivalent alterations and modifications will occur to others skilled in the art upon the reading and understanding of the specification. The present invention includes all such equivalent alterations and modifications and is limited only by the scope of the claims.

The embodiments of the invention in which an exclusive property or privilege is claimed are defined as follows:

1. A swivel hose coupling comprising a swivel insert, means for attaching said swivel insert to an end of a hose, said swivel insert including a sleeve portion surrounding such hose end, and a swivel hose end piece surrounding said swivel insert said swivel hose end piece having an internal cylindrical groove therein in which an external cylindrical portion of said sleeve portion having an outer diamater less than the inner diameter of said internal groove is rotatably received, said internal groove having opposite axial inner and outer ends overlapping opposite axial inner and outer ends of said sleeve portion to retain said sleeve portion within said internal groove, said sleeve portin having a plurality of circumferentially spaced longitudinally extending grooves in said external cylindrical portion separated by relatively narrow ribs threbetween for reducing frictional contact between said swivel insert and swivel hose end piece during relative rotation therebetween.

2. A swivel hose coupling in accordance with claim 1 wherein said longitudinally extending grooves terminate short of the axial inner end of said external cylindrical portion to provide an external flange on said sleeve portion at theaxial inner end of said external cylindrical portion which overlaps the axial inner end of said internal groove in said swivel hose end piece.

3. A swivel hose coupling in accordance with claim 1 wherein said sleeve portion has an inturned flange at the axial outer end of said sleeve portion for engagement by a tip of such hose, said inturned flange overlapping the axial outer end of said internal groove in said swivel hose end piece.

4. A swivel hose coupling in accordance with claim 1 wherein said swivel hose end piece includes annular skirt means extending axially inwardly from the axial outer end of said internal groove and radially inwardly spaced therefrom, said skirt means being adapted to extend into said swivel insert to prevent entrained material in fluid passing through said coupling from entering a swivel connection between said swivel insert and swivel hose end piece.

5. A swivel hose coupling in accordance with claim 4 wherein said swivel hose end piece has an axial outer end portion extending forwardly of said internal groove, said axial outer end portion of said swivel hose end piece having a longitudinal opening therethrough in line with a center of the hose end, said skirt means extending said opening into such hose end beyond the axial outer end of said sleeve portion of said swivel insert.

6. A swivel hose coupling in accordance with claim 1 wherein said swivel insert is internally threaded for threaded engagement onto the end of a corrugated hose.

7. A swivel hose coupling in accordance with claim 1 further comprising a plain end portion attached to the axial outer end of said swivel hose end piece, said swivel insert and swivel hose end piece being made of a relatively hard plastic material having a relatively low coefficient of friction whereby said swivel hose end piece is freely rotatable relative to said swivel insert, said plain end portion being made of a more pliable plastic material to facilitate insertion of an attachment piece over the axial outer end of said plain end portion for enhanced gripping therebetween.

8. A swivel hose coupling in accordance with claim 7 wherein said plain end portion has an external annular groove adjacent the axial inner end thereof, and said swivel hose end piece has an inturned end at the axial outer end thereof which is received in said external groove for attaching said plain end portion to said swivel hose end piece.

9. A swivel hose coupling in accordance with claim 8 wherein said plain end portion has radially outwardly extending flanges adjacent opposite sides of said external groove to provide increased support for said inturned end in said groove.

10. A swivel hose coupling in accordance with claim 9 further comprising an inturned flange on said swivel hose end piece axially inwardly of said inturned end, the axial spacing between said inturned flange and inturned end being slightly greater than the axial thickness of the radially outwardly extending flange on the axial inner end of said plain end portion to accommodate said last-mentioned flange therebetween.

11. A swivel hose coupling comprising a swivel insert, means for attaching said swivel insert to an end of a hose, said swivel insert including a sleeve portion surrounding such hose end, and a swivel hose end piece surrounding said swivel insert, said swivel hose end piece having an internal cylindrical groove therein in which an external cylindrical portion of said sleeve portion having an outer diameter less than the inner diameter of said internal groove is rotatably received, said internal groove having opposite axial inner and outer ends overlapping opposite axial inner and outer ends of said sleeve portion to retain said sleeve portion within said internal groove, said swivel hose end piece having a radially outwardly tapered opening adjacent an axial inner end thereof to facilitate camming of the axial inner end of said swivel hose end piece over an axial outer end of said swivel insert as said swivel hose end piece is pushed onto and along said sleeve portion until said sleeve portion sets within said internal groove in said swivel hose end piece.

12. A swivel hose coupling in accordance with claim 11 wherein said swivel insert comprises a hot melt grommet having an inner diameter slightly greater than the outer diameter of said hose to permit said grommet to be inserted over the end of said hose, said grommet having a radially inturned flange at the axial outer end thereof which is engaged by the tip of said hose, said hose and grommet being secured together by hot melt material between said inturned flange and hose tip.

13. A swivel hose coupling in accordance with claim 11 further comprising flexible annular sealing lip means integral with the exterior of said sleeve portion and engageable with the wall of said internal groove in said swivel hose end piece for providing a fluid-tight seal therebetween.

14. A swivel hose coupling in accordance with claim 13 wherein said sealing lip means tapers outwardly from said sleeve portion and then extends axially toward the axial inner end of said sleeve portion.

15. A swivel hose coupling comprising a swivel insert, means for attaching said swivel insert to an end of a hose, said swivel insert including a sleeve portion surrounding such hose end, and a swivel hose end piece surrounding said swivel insert, said swivel hose end piece having an internal cylindrical groove therein in which an external cylindrical portion of said sleeve portion having an outer diameter less than the inner diameter of said internal groove is rotatably received, said internal groove having opposite axial inner and outer ends overlapping opposite axial inner and outer ends of said sleeve portion to retain said sleeve portion within said internal groove, said swivel insert including another sleeve portion radially inwardly spaced from said first-mentioned sleeve portion, both of said sleeve portions having axial outer ends connected together by a radially extending end wall portion, said another sleeve portion being externally threaded for internal threaded engagement with the end of a wire reinforced hose.

16. A swivel hose coupling in accordance with claim 15 wherein said another sleeve portion has an axial inner end that tapers radially inwardly toward the axial inner end of said another sleeve portion to provide an inwardly flaired end surface to aid in threading said another sleeve portion into said hose.

17. A swivel hose coupling comprising a swivel insert, means for securing said swivel to an end of a hose, and a swivel hose end piece surrounding said swivel insert, said swivel hose end piece having an internal annular groove therein which an external portion of said swivel insert is rotatably received, said internal groove having opposite axial inner and outer ends overlapping opposite axial inner and outer ends of said swivel insert, and annular skirt means integral with said swivel hose end piece and extending axially inwardly from the axial outer end of said internal groove and radially inwardly spaced therefrom, said skirt means extending axially inwardly beyond the axial outer end of said swivel insert to prevent entrained material in fluid passing through said coupling from entering a swivel connection between said swivel insert and swivel hose end piece, said swivel hose end piece having an axial outer end portion extending forwardly of said internal groove, said outer end portion of said swivel hose end piece having a longitudinal opening therethrough in line with the center of the hose end, said skirt means extending said opening into the end of said hose beyond the axial outer end of said swivel insert, said swivel insert including a pair of concentric radially spaced inner and outer tubular sleeve portions having axial outer ends connected together by a radially extending end wall portion, said inner sleeve portion being externally threaded for internal threaded engagement with a wire reinforced hose, said skirt means extending axially into said inner sleeve portion of said swivel insert.

18. A swivel hose coupling comprising a swivel insert, means for securing said swivel insert to an end of a hose, and a swivel hose end piece surrounding said swivel insert, said swivel hose end piece having an internal annular groove therein in which an external portion of said swivel insert is rotatably received, said internal groove having opposite axial inner and outer ends overlapping opposite axial inner and outer ends of said swivel insert, and annular skirt means integral with said swivel hose end piece and extending axially inwardly from the axial outer end of said internal groove and radially inwardly spaced therefrom, said skirt means extending axially inwardly beyond the axial outer end of said swivel insert to prevent entrained material in fluid passing through said coupling from entering a swivel connection between said swivel insert and swivel hose end piece, said swivel hose end piece having a radially outwardly tapered opening adjacent an axial inner end thereof to facilitate camming of said axial inner end of said swivel hose end piece over the axial outer end of said swivel insert as said swivel hose end piece is pushed onto and along said swivel insert until said swivel insert seats within said internal groove in said swivel hose end piece.

19. A swivel hose coupling in accordance with claim 18 wherein said swivel hose end piece has an axial outer end portion extending forwardly of said internal groove, said outer end portion of said swivel hose end piece having a longitudinal opening therethrough in line with the center of the hose end, said skirt means extending said opening into the end of said hose beyond the axial outer end of said swivel insert.

20. A swivel hose coupling in accordance with claim 18 further comprising flexible annular sealing lip means integral with the exterior of said swivel insert and engageable with the wall of said internal groove in said swivel hose end piece to establish a fluid-tight seal therebetwen while permitting relative rotation therebetween.

21. A swivel hose coupling in accordance with claim 20 wherein said sealing lip means tapers outwardly from said swivel insert and then extends axially toward the axial inner end of said swivel insert.

* * * * *